(12) United States Patent
Lacoss-Arnold et al.

(10) Patent No.: US 11,720,895 B2
(45) Date of Patent: Aug. 8, 2023

(54) SYSTEMS AND METHODS FOR USE IN FACILITATING NETWORK MESSAGING

(71) Applicant: MASTERCARD INTERNATIONAL INCORPORATED, Purchase, NY (US)

(72) Inventors: Jason Jay Lacoss-Arnold, St. Louis, MO (US); Andrew David Lambert, Chesterfield, MO (US); Christy Hart, Wood Dale, IL (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 17/066,234

(22) Filed: Oct. 8, 2020

(65) Prior Publication Data
US 2021/0110392 A1 Apr. 15, 2021

Related U.S. Application Data

(60) Provisional application No. 62/913,943, filed on Oct. 11, 2019.

(51) Int. Cl.
*G06Q 20/40* (2012.01)
*H04L 9/40* (2022.01)

(52) U.S. Cl.
CPC ......... *G06Q 20/401* (2013.01); *G06Q 20/405* (2013.01); *G06Q 20/4097* (2013.01); *H04L 63/18* (2013.01)

(58) Field of Classification Search
CPC .............. G06Q 20/401; G06Q 20/405; G06Q 20/4097; H01L 63/18
See application file for complete search history.

(56) References Cited

U.S. PATENT DOCUMENTS 9,524,501 B2  12/2016  Weber
10,535,064 B2 * 1/2020  Gordon .................. G06Q 20/40
(Continued)

OTHER PUBLICATIONS

M. A. Sirbu, "Credits and debits on the Internet," in IEEE Spectrum, vol. 34, bo. 2, pp. 23-29, Feb. 1997 (Electronic Payments).

*Primary Examiner* — Mike Anderson
*Assistant Examiner* — Matthew Cobb
(74) *Attorney, Agent, or Firm* — Harness, Dickey & Pierce, P.L.C.

(57) ABSTRACT

Systems and methods are provided for use in facilitating network messages. An exemplary method includes receiving, at a network, an instruction associated with a first user and specific to a first user account, where the instruction is directed to a second user account associated with a second user. The method also includes compiling a pre-authorization message indicative of the instruction, consistent with a first message standard and including an identifier of the first user account, and transmitting the pre-authorization message to a first institution associated with the first user account. The method then includes translating the pre-authorization message and/or the instruction into a transfer instruction consistent with a second message standard different than the first message standard, and transmitting the transfer instruction to a different network thereby permitting the delivery of the transfer instruction consistent with the second standard to a second institution associated with the second user account.

13 Claims, 4 Drawing Sheets

(56) References Cited

U.S. PATENT DOCUMENTS

| | | |
|---|---|---|
| 10,878,428 B1 | 12/2020 | Comeaux et al. |
| 2007/0299774 A1 | 12/2007 | Eaves |
| 2008/0288405 A1 | 11/2008 | John |
| 2011/0067049 A1 | 3/2011 | Piepenbrink et al. |
| 2012/0030115 A1 | 2/2012 | Peace et al. |
| 2012/0109821 A1 | 5/2012 | Barbour et al. |
| 2012/0284175 A1 | 11/2012 | Wilson et al. |
| 2013/0103481 A1 | 4/2013 | Carpenter et al. |
| 2014/0074724 A1 | 3/2014 | Gordon et al. |
| 2014/0278741 A1 | 9/2014 | Batra et al. |
| 2014/0358589 A1 | 12/2014 | Schmitt et al. |
| 2015/0006426 A1 | 1/2015 | Sobhani et al. |
| 2015/0302103 A1 | 10/2015 | Jeremias |
| 2015/0302404 A1 | 10/2015 | Ruffer et al. |
| 2015/0319203 A1 | 11/2015 | Jeremias |
| 2015/0356639 A1 | 12/2015 | Sobhani |
| 2016/0034875 A1 | 2/2016 | Stevens et al. |
| 2016/0042472 A1 | 2/2016 | Khosravi |
| 2016/0132880 A1 | 5/2016 | O'Regan et al. |
| 2016/0180325 A1 | 6/2016 | Davis et al. |
| 2016/0180341 A1 | 6/2016 | Garlick et al. |
| 2016/0212266 A1 | 7/2016 | Soundar |
| 2016/0321634 A1* | 11/2016 | George .................. G06Q 20/202 |
| 2017/0004501 A1 | 1/2017 | Ledford et al. |
| 2017/0076365 A1 | 3/2017 | D'Souza et al. |
| 2017/0116605 A1* | 4/2017 | Unser .................. G06Q 20/405 |
| 2017/0193606 A1 | 7/2017 | Thomas et al. |
| 2017/0221049 A1 | 8/2017 | Jivraj et al. |
| 2017/0221066 A1 | 8/2017 | Ledford et al. |
| 2017/0262819 A1 | 9/2017 | Malhotra et al. |
| 2017/0270522 A1 | 9/2017 | Chikuvadze |
| 2018/0068284 A1* | 3/2018 | Wudaru .................. G06Q 20/12 |
| 2018/0089683 A1 | 3/2018 | Setty et al. |
| 2018/0091524 A1 | 3/2018 | Setty et al. |
| 2018/0108056 A1 | 4/2018 | Chikuvadze |
| 2018/0122002 A1* | 5/2018 | Kelly .................. G06Q 20/405 |
| 2018/0248918 A1 | 8/2018 | Shen et al. |
| 2018/0308070 A1 | 10/2018 | Raina |
| 2019/0188710 A1* | 6/2019 | Mittal .................. G06Q 20/3829 |
| 2019/0228393 A1 | 7/2019 | Hu et al. |
| 2019/0228414 A1* | 7/2019 | Dayal .................. G06Q 20/227 |
| 2019/0334884 A1 | 10/2019 | Ross et al. |
| 2020/0034813 A1 | 1/2020 | Calinog et al. |
| 2020/0151686 A1 | 5/2020 | Komandur et al. |
| 2020/0175496 A1 | 6/2020 | Finke et al. |
| 2020/0184054 A1 | 6/2020 | Storm et al. |
| 2020/0210903 A1 | 7/2020 | Avila |
| 2020/0265457 A1 | 8/2020 | Miller et al. |
| 2020/0279235 A1 | 9/2020 | Booth et al. |
| 2020/0391121 A1 | 12/2020 | Jaramillo |
| 2021/0012341 A1* | 1/2021 | Garg .................. G06Q 20/405 |
| 2021/0073750 A1 | 3/2021 | Ledford et al. |
| 2021/0103909 A1 | 4/2021 | Widmann et al. |
| 2021/0142328 A1 | 5/2021 | Sylvester et al. |

* cited by examiner

SYSTEMS AND METHODS FOR USE IN FACILITATING NETWORK MESSAGING

CROSS-REFERENCE TO RELATED APPLICATION

This application claims the benefit of, and priority to, U.S. Provisional Application No. 62/913,943 filed on Oct. 11, 2019. The entire disclosure of the above-referenced application is incorporated herein by reference.

FIELD

The present disclosure generally relates to systems and methods for use in facilitating network messaging, and in particular, to systems and methods for use in adapting network messaging to certain standards, while pushing the network messaging to other network protocols.

BACKGROUND

This section provides background information related to the present disclosure which is not necessarily prior art.

Entities are known to facilitate network messaging for various different purposes. Transferring funds is one such propose, in which messages indicate the transfer of funds from one account to another account. In one example, the network messaging may indicate a transfer of funds in connection with the purchase of products or services by a user from a provider of such products or services. Also, the network messaging may be provided through conventional payment networks, or it may be made through real time payment networks such as The Clearing House™ or Zelle™. Specifically, in the context of real time payment networks, The Clearing House™, for example, provides a platform to accommodate real time fund transfers for financial institutions integrated into the platform.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Network messaging is often defined according to a protocol or standard. For example, ISO 8583 is an international standard for financial transaction card originated interchange messaging, and ISO 20022 is also a standard for electronic data interchange between financial institutions. When a financial institution integrates with a network that relies on one of these standards, such integration involves a substantial undertaking to provided computing resources, implementation investments, testing, compliance, etc. to ensure that messaging transmitted and/or received is compliant with the standard(s). What's more, after the financial institution integrates the standard, it may be burdensome to subsequently leave the standard and/or to integrate with a different standard. For example, a financial institution, which is integrated with an ISO 8583 standard network, may resist adopting the ISO 20022 standard, despite the advantages of the real time transaction processing accessible via the ISO 20022 standard, in view of the necessary resource allocation and burden involved to change to and/or conform to the ISO 20022 standard.

Uniquely, the systems and methods herein permit for advising institutions about fund transfers pursuant to appropriate message standards, where the transactions are coordinated through different ones of the message standards, via multiple networks. In this manner, the institutions are permitted to rely on resources already dedicated to (and implemented for) particular ones of the message standards, in connection with messaging regarding fund transfers extending to other standards, thereby avoiding the implementation of additional or different message standards at the institutions. As such, the systems and methods herein permit the functionality of existing infrastructure to be extended by institutions to offer added functionality across the multiple message standards.

Figure 1:
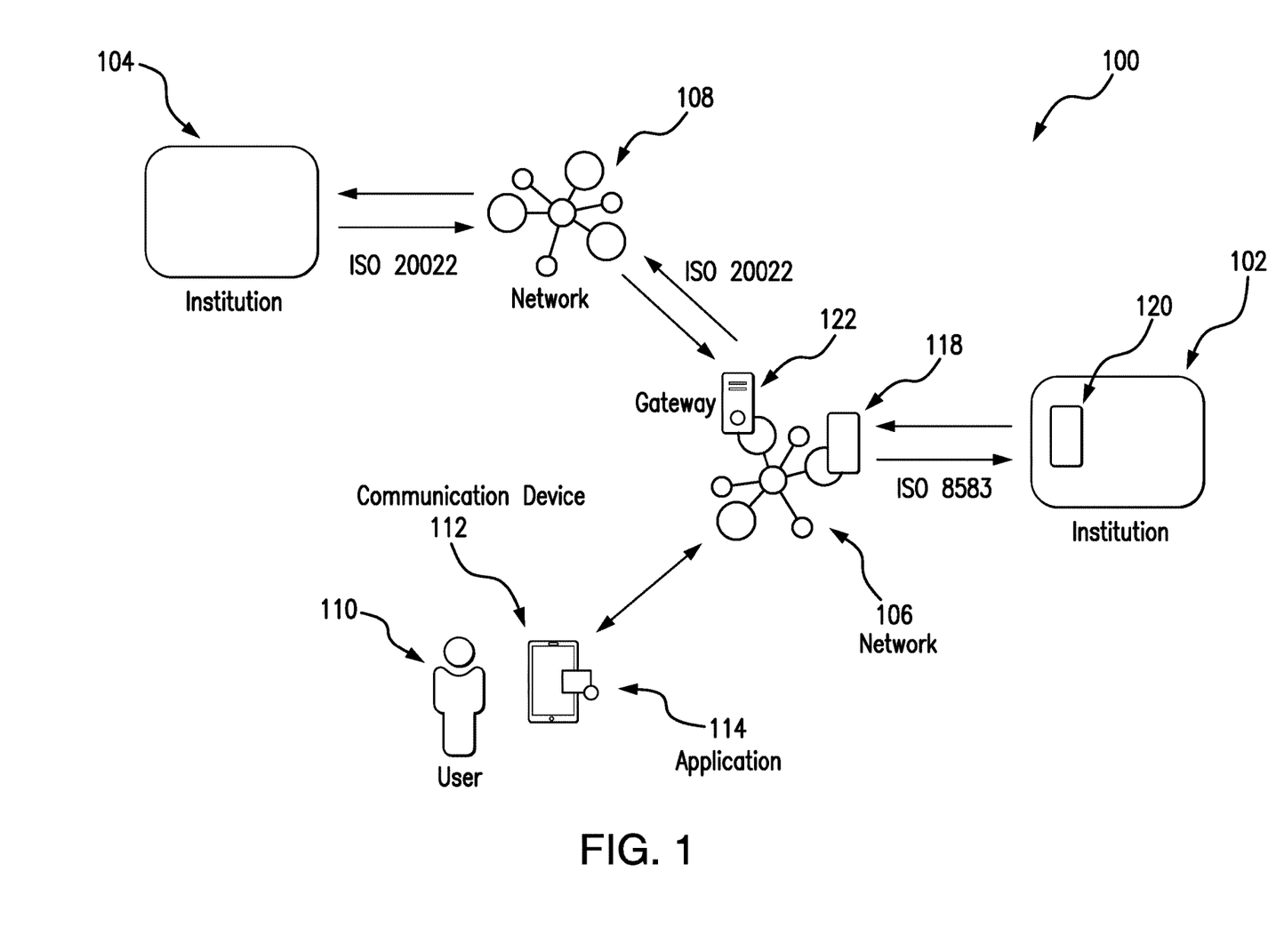
FIG. 1 is an exemplary system of the present disclosure suitable for use in facilitating network messaging.

FIG. 1 illustrates an exemplary system 100, in which one or more aspects of the present disclosure may be implemented. Although the system 100 is presented in one arrangement in FIG. 1, other embodiments may include systems arranged otherwise depending, for example, on a manner in which network messaging is initiated, specific standards employed in the networks, users involved in the network messaging, privacy rules and regulations, etc.

In the illustrated embodiment, the system 100 generally includes institutions 102 and 104, a first network 106, and a second network 108, each coupled to (and in communication with) one or more communication networks. The one or more communication networks are represented in FIG. 1 by the various arrowed lines and each may include, without limitation, a local area network (LAN), a wide area network (WAN) (e.g., the Internet, etc.), a mobile network, and/or another suitable public and/or private network capable of supporting communication among two or more of the parts illustrated in FIG. 1, or any combination thereof. For example, one of the networks may include multiple different networks, such as a private network made accessible by the network 106 to the institutions 102 and 104 and, separately, the public Internet, which is accessible as desired by the network 106 and/or the institutions 102 and 104 and one or more devices associated with users in the system 100, etc.

The institution 102 in the system 100 is a banking institution or financial institution, which is configured to issue one or more accounts (e.g., credit accounts, debit accounts, prepaid accounts, or other financial accounts or payment accounts, etc.) to users or other entities. In this example, the institution 102 is associated with a user 110 and has issued an account to the user 110. Similarly, the institution 104 is a banking institution, which is configured to issue one or more accounts (e.g., credit accounts, debit accounts, prepaid accounts, or other financial accounts or payment accounts, etc.) to users or other entities. And, in this example, the institution 104 has issued a second account to a different user and/or a business or an entity, such as, for example, a provider of goods and/or services (e.g., a merchant, etc.). With that said, in various embodiments, the institutions 102 and 104 may each be other types of entities (e.g., financial or otherwise, etc.), while still associated with the users and/or fund transfers as described herein.

The institution 102 is coupled in communication with the network 106. In this exemplary embodiment, the institution 102 is configured to communicate with the network 106, via a first standard, such as, for example, the ISO 8583 standard, as indicated in FIG. 1, etc. That is, the institution 102 includes computing resources dedicated to the ISO 8583 standard, whereby each is configured to participate in the coordination messaging in that standard (as related to fund transfers). In connection therewith, as shown in FIG. 1, the network 106 includes a Base24 computing device 118, which is specially (or specifically) configured to communicate messaging with the institution 102, for example, consistent with the ISO 8583 standard (e.g., in connection with switching financial transactions, etc.) (e.g., a computing device configured to handle a series of applications produced by ACI Worldwide, Inc. that support payment systems; an enterprise-class payments solution device configured to acquire, authenticate, switch and/or authorize financial transactions across multiple channels; an electronic funds transfer processing and switching device configured to provide, for example, ATM support and management such as transaction routing and authorization, electronic data interchange, settlement, reporting, network control, and stored-value card functionality; a payment engine computing device configured to acquire, authenticate, route, switch, and authorize financial transactions across multiple channels; another payment system computing device; etc.). While, in the illustrated embodiment, the computing device 118 is specific to Base24, it should be appreciated that the computing device 118 may be tailored to other standards and/or may be specific to applications other than Base24 in other embodiments. Likewise, the institution 102 also includes a Base24 computing device 120, which is specially (or specifically) configured to communicate messaging consistent with the ISO 8583 standard.

Messaging between the institution 102 and the network 106 may be provided in connection with, for example, authorization, clearing and/or settlement of transactions (e.g., consistent with messaging in the conventional four party model for a payment account transaction, etc.), etc. For instance, the network 106 may be configured to pass pre-authorization messages and/or authorization messages (broadly, network messages), from an acquirer to the institution 102 (as an issuer of an account used in a transaction at a merchant), via the Base24 computing device 118 to the Base24 computing device 120, to seek pre-authorization or authorization for a fund transfer, and to pass a pre-authorization or an authorization reply (broadly, a network message) back to the acquirer from the issuer for the fund transfer, where the pre-authorization, the authorization request and the authorization reply include messaging pursuant to the ISO 8583 standard (e.g., x1xx authorization messages, x2xx authorization messages, etc.). The network 106 is configured to then later clear and settle the transaction, along with others, among the acquirer and the issuer.

More specifically, the network messaging between the institution 102 and the network 106 may be consistent with single message flow or dual message flow. For processing, for example, the system 100 is configured consistent with the single message flow model. In particular, the messages above may include a 0200 message to the issuer of an account, who responds with a 0210 approval message. In connection therewith, in the payment flows, the payment may be reversed with a 0220 advice message (but is otherwise assumed to be complete). That said, alternatively, a different standard may be followed (e.g., as in the Maestro™ model, etc.), whereby a 0200 message, a 0210 response message, and then a 0220 completion message followed by a 0230 completion acknowledgment message may be used. It should be appreciated that certain networks, such as, for example, the ACH or SEPA networks, etc., may revert to a dual message flow with online clearing and a hold placed on the authorization messages. In any case, the network 106, in this example, defines multiple different network IDs, each unique to a different payments network (e.g., the network 108 or other network (not shown), etc.), which, as described below, may provide visibility of which networks are being used to the involved institution(s).

In connection with the above, funds are generally available within a day or multiple days for a user to access and/or utilize in funding transfers and/or transactions. It should be appreciated, therefore, that the above standards do not provide for real time transactions.

Also in the system 100, the institution 104 is coupled in communication with the network 108. In this exemplary embodiment, the institution 104 is configured to communicate with the network 108, via a second standard, which is different from the first standard (described above). Here, the institution 104 is configured to communicate with the network 108 via the ISO 20022 standard, as indicated in FIG. 1, thereby providing for real time transaction and/or fund transfers (e.g., for transactions involving accounts issued by the institution 104, etc.). That is, the institution 104 includes computing resources dedicated to the ISO 20022 standard, whereby each is configured to participate in the coordination messaging in that standard (as related to fund transfers). In this manner, the network 108 may include any suitable real time payment platform, including, for example, The Clearing House or Zelle Network®, Mastercard Send, Real Time ACH, SEPA Instant Payment (European), or other national real time or faster pay networks, etc. That said, it should be appreciated that the institution 104 may be configured to communicate otherwise, in other system embodiments, including, for example, via one or more application programming interfaces (APIs), etc., yet still provide (or support) real time transactions and/or fund transfers, as above.

In connection with the above, funds are generally available within minutes, or potentially an hour or a few hours, for a user to access and/or utilize in funding transfers and/or transactions. It should be appreciated, therefore, that the above standard, as an example, provides for real time transactions.

It should be appreciated that the above ISO standard messaging are often communicated along the "payment rails" of the networks 106 and 108, whereby the messaging consistent with the standard actually facilitates the transfer of funds between accounts. It should be appreciated that the networks 106 and 108 may be configured to transmit and receive other messaging from the institutions 102 and 104 apart from the payment rails (apart from the ISO standard message) yet still related to the fund transfers. In at least one embodiment, fund transfer instruction(s) may be received via an application programming interface (API) from the institutions 102 or 104, as describe further below.

As further shown in FIG. 1, the user 110 is associated with a communication device 112, which includes a network-based application 114. The communication device 112 may include, without limitation, a smartphone, a tablet, a computer, etc. And, the network-based application 114 may include, for example, a virtual wallet, an institution application, or other application, which is associated with the user's account issued by the institution 102 (e.g., as an account provisioned to the application 114, etc.). In this exemplary embodiment, the application 114 includes an application associated with the institution 102, which includes a software development kit (SDK) provided by the network 106. The SDK, as integrated in the application 114, permits the application 114 to configure the communication device 112 to operate as described herein (e.g., transmit fund transfer instructions, present transfer notices, etc.).

In connection therewith, in response to at least one input from the user 110 to the application 114, the communication device 112 is configured, by the application 114, to provide a transfer instruction to the network 106 (or, potentially, to call an API for transfer instructions exposed by the network 106, etc.), in order to initiate a real time transfer, from the account issued by the institution 102 (i.e., the originator institution), to another entity. The transfer instruction includes, among other things, an amount of the transfer, an identification of the user's account at the institution 102, an identification of a destination account (e.g., at the institution 104, etc.), etc.

The network 106 is configured to receive the user's transfer instruction from the communication device 112 (via the application 114 or the API, for example). The network 106 includes a platform, generally, but may include, more specifically, a processor included within the platform, that receives the instruction. The processor may include a subset of computing devices within the platform and, for example, may be configured to "offer on-behalf-of" services to institutions, such as, for example, the institution 102. In this exemplary embodiment, in response to the transfer instruction, the network 106 is configured to compile and transmit a pre-authorization message to the institution 102 (i.e., the originator institution), via the Base24 computing device 118, in the ISO 8583 standard. Specifically, for example, the pre-authorization message includes the amount of the transaction and identification of the user's source account at the institution 102 and the destination account for the funds, for example, at the institution 104. Other information included in the pre-authorization message may include a network ID of the network 108, for example, names, phone numbers, email addresses, etc.), notations for the transfer, sanction screening data, etc. While the ISO 8583 standard is employed here, it should be appreciated that the network 106 may be configured to communicate with the institution 102 via one or more APIs (e.g., REST API, etc.) or otherwise, (i.e., a standard such as the ISO 20022 standard of the network 108 or other standard) in other embodiments. In addition to the pre-authorization message, the network 106 is configured to create an entry in a ledger for the institution 102 and/or the user 110 indicating the details of the transfer.

In addition, it should be appreciated that if Base24 is unable to connect to the institution 102 (e.g., via the computing device 118, etc.), the network 106 may be configured to make a decision on behalf of the institution 102 (using, among other things, a stored indication of a balance on the account involved in the transfer). If so, the network 106 is configured to then store and forward the transaction information to the institution 102 when the institution 102 is accessible again.

In response, in either case, the institution 102 is configured to receive the pre-authorization request message via the Base24 computing device 120, to reduce the credit and/or funds of the account of the user 110 by an amount of the requested transfer, and to respond to the network 106 with a reply message to the pre-authorization request (e.g., an indication of sufficient funds, etc.), via the Base24 computing device 120 (in the ISO 8583 standard, in this example).

The network 106 includes a messaging gateway 122, which is configured to communicate with the network 108 to provide fund transfers to and/or from institutions associated with the network 108. In the above example, after receiving the reply message to the pre-authorization request (or, in some embodiments, in connection with (or after) compiling and/or transmitting the pre-authorization request), the network 106 is configured to pass the user's transfer instruction to the messaging gateway 122. In turn, the messaging gateway 122 is configured to compile and transmit a fund transfer message, to the network 108, which is consistent with the ISO 20022 standard (or potentially, by way of an API in other embodiments). Like the pre-authorization message, the transfer message includes an amount of the transfer and identifications of the user's source account at the institution 102 and destination account at the institution 104 (e.g., based on a mapping of data elements from the pre-authorization message and/or instruction to the transfer instruction, etc.). The transfer message may include other information, such as, for example, notations for the transfers (e.g., memos, etc.), directory data (e.g., an email address for the user 110, a phone number for the user 110, etc.), invoice data, network ID, or other information about the transaction, etc. The network 108, in turn, is configured to transmit the transfer message, consistent with the ISO 20022 standard, to the institution 104 (i.e., the recipient institution). In response to the transfer message, the institution 104 is configured to generate a response message, which includes a confirmation of the transaction. And, the network 108 is configured to pass the response message to the gateway 122, which, in turn, is configured to receive the response message at the network 106.

Once the transfer is performed (e.g., based on the response message(s), etc.), the network 106 is configured to compile and transmit an authorization completion message to the institution 102, via the Base24 computing device 118, in the ISO 8583 standard. Specifically, consistent with the above, the authorization completion message may include a 0200 ISO 8583 message to the institution 102, which includes the amount of the transaction and the account details for the source and destination accounts, and other suitable information, etc. The institution 102, in turn, is configured to receive the authorization completion message, via the Base24 computing device 120, in the ISO 8583 standard, to store the same in connection with the user's account, and to respond. Specifically, for a single message implementation, the institution 102 is configured to transmit a response message, which may include a 0210 ISO 8583 approval to the network 106. It should be appreciated that, if the payment is completed, it may potentially be reversed with a 0220 ISO 8583 advice message (but is otherwise assumed to be complete). Additionally, or alternatively, for a dual message implementation, the network 106 may be configured as described above and further configured to then transmit a 0220 completion message, which is followed by a 0230 completion acknowledgment message which the institution 102 is configured to transmit back to the network 106.

In addition, the network 106 is configured to transmit an auxiliary message to the institution 102, via one or more formats or standards, but generally not the ISO 8583 or ISO 20022 standard or format (e.g., thereby bypassing the Base24 computing devices 118 and 120 (and the "payment rails"), etc.). The auxiliary message will include additional data about the transaction not included in the pre-authorization or authorization completion messages. For instance, the ISO 20022 messages communicated between the institution 104 and the network 108 may include additional data and/or fields of data associated with and/or descriptive of the transaction (e.g., as provided by the gateway 122 as necessary, etc.), as compared to the ISO 8583 messages transmitted between the institution 102 and the network 106. As such, the auxiliary message provides a mechanism for the network 106 to deliver that additional data to the institution 102. The additional data may include, for example, other information such as, for example, memo notations, directory data (e.g., an email address or phone number, etc.), invoice data, or other information about the transaction, etc.

As part of the above example transaction, then, the system 100 is configured to facilitate a push transaction from the account of the user 110 (at the institution 102) to the destination account (at the institution 104). Additionally, or alternatively, the system 100 may be configured to facilitate a pull transaction from the account of the user 110 (at the institution 102).

In connection with the above description, it should be appreciated that the network 106, as described above, may be configured to rely on a single message format in informing the institution 102 about the user's transaction (e.g., based on the ISO 8583 standard, etc.). That said, in other embodiments, a dual message format may be employed by the network 106 to inform the institution 102 about the user's transaction and/or to complete the transaction with the institution 102. What's more, it should be appreciated that the network 106 may be configured to provide stand-in operation associated with fund transfers whereby the network 106 may commit to the transfer when the institution 102, for example, is unavailable.

Figure 2:
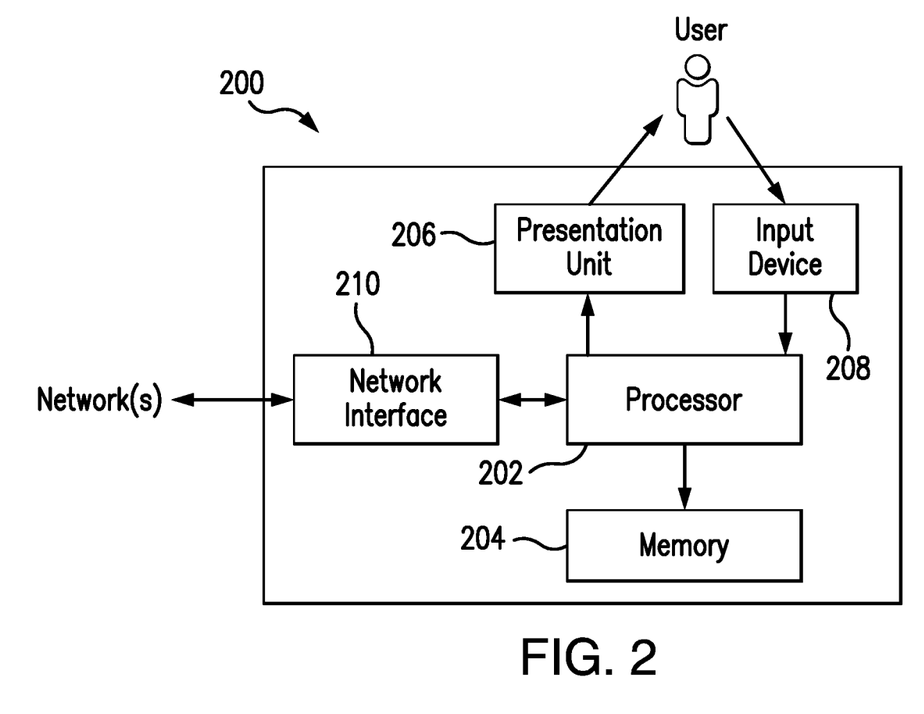
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, POS terminals, laptops, tablets, smartphones, PDAs, etc. In addition, the computing device 200 may include a single computing device, or it may include multiple computing devices located in close proximity or distributed over a geographic region as a network of computing devices, so long as the computing devices are specifically configured to function as described herein. In particular, in the exemplary system 100 of FIG. 1, each of the institutions 102 and 104 and the networks 106 and 108 should be understood as being implemented in (and/or otherwise including) one or more computing devices consistent with the computing device 200. In addition, the communication device 112, the computing devices 118 and 120, and the gateway 122 may also (in at least one or more aspects) be consistent with computing device 200. That said, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, message format translation details, instructions for messaging in particular standards, and/or other types of data (and/or data structures) suitable for use as described herein.

Furthermore, in various embodiments, executable instructions may be stored in the memory 204 for execution by the processor 202 to cause the processor 202 to perform one or more of the operations described herein (e.g., one or more of the operations described in method 300, one or more of the operations described in method 400, etc.), such that the memory 204 is a physical, tangible, and non-transitory computer readable storage media. Such instructions often improve the efficiencies and/or performance of the processor 202 that is performing one or more of the various operations herein, whereby the instructions effectively transform the computing device 200 into a special purpose device configured to perform the unique and specific operations described herein. It should be appreciated that the memory 204 may include a variety of different memories, each implemented in one or more of the functions or processes described herein.

In addition in the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information (e.g., a notification associated with a transfer, etc.), either visually or audibly, to a user of the computing device 200, for example, to the user 110 in the system 100, to users associated with other parts of the system 100, etc. And, various interfaces (e.g., as defined by applications, webpages, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

The computing device 200 also includes an input device 208 that receives inputs from the user of the device (i.e., user inputs) such as, for example, transfer request instructions, etc. The input device 208 is coupled to (and is in communication with) the processor 202 and may include, for example, a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device (e.g., the communication device 112, etc.), may behave as both the presentation unit 206 and the input device 208.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including one or more of the networks in FIG. 1. Further, in some exemplary embodiments, the computing device 200 may include the processor 202 and one or more network interfaces (including the network interface 210) incorporated into or with the processor 202.

Figure 3:
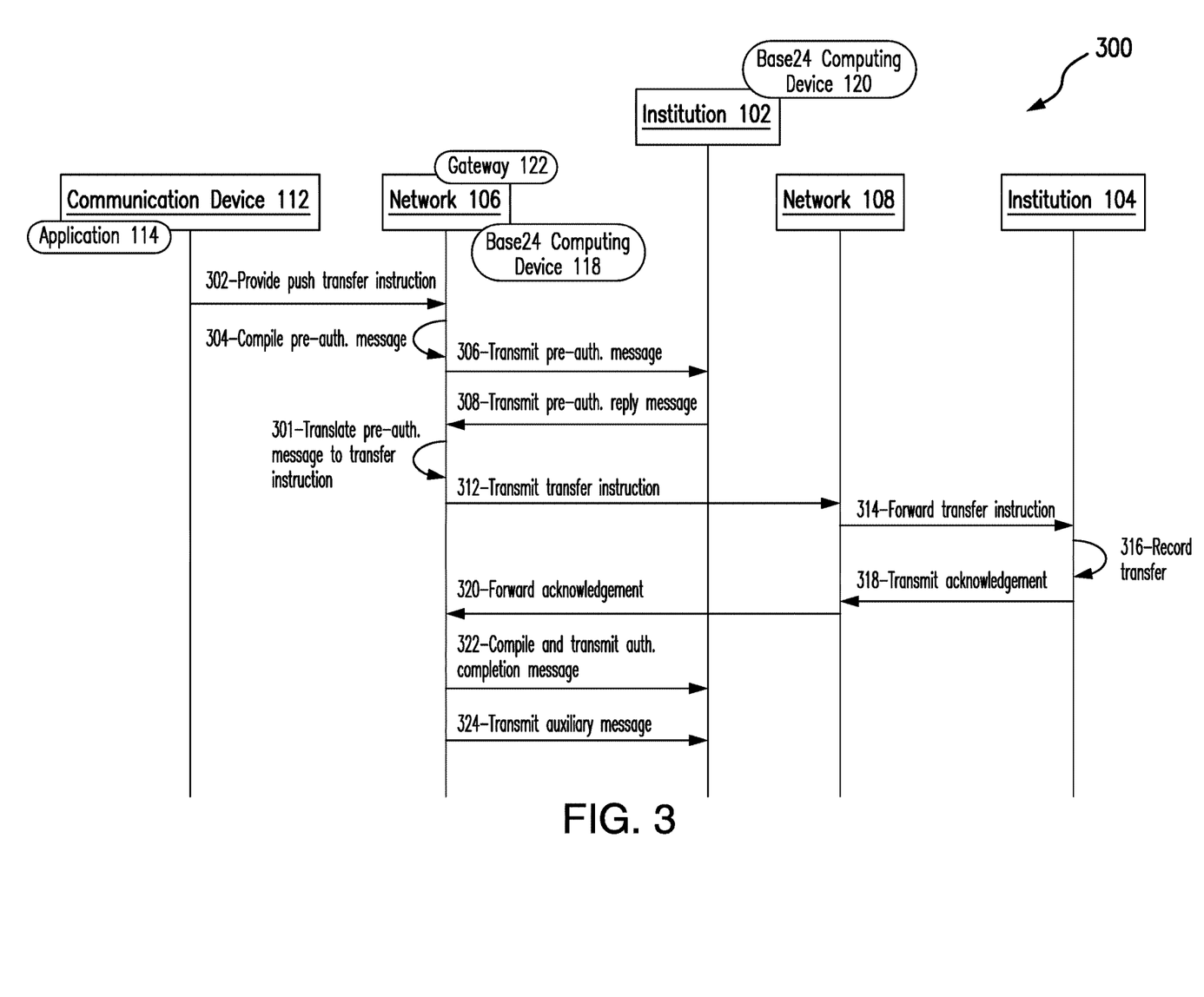
FIG. 3 is an exemplary method that may be implemented in the system of FIG. 1 for use in facilitating messaging between networks in connection with a push transaction by a user.

FIG. 3 illustrates an exemplary method 300 for use in facilitating a push fund transfer from an account associated with a user. The exemplary method 300 is described with reference to FIG. 1, including the institutions 102 and 104, the networks 106 and 108, and the communication device 112, and also with reference to the computing device 200 of FIG. 2. However, it should be understood that the method 300 is not limited to the system 100 or the computing device 200. And, likewise, the systems and the computing devices herein should not be understood to be limited to the exemplary method 300.

At the outset in the method 300, the user 110 decides to transfer funds from the user's account issued by the institution 102 (e.g., where the institution 102 may be referred to as an originator, etc.) to an account of a user/entity issued by the institution 104 (e.g., where the institution 104 may be referred to as a recipient, etc.). In connection therewith, the user 110 accesses the application 114, at the communication device 112, and provides an instruction to transfer funds. The instruction includes an identifier of the source account of funds for the transfer, i.e., the user's account, which may include an account number or token associated with the account, etc. The instruction also includes an identification of the destination account at the institution 104, which may include, again, an account number or token associated with the account, etc. And, the instruction further includes an amount to be transferred, and any other details which may be needed or helpful in the transfer (e.g., a name of the user 110 (and/or other user identifier, phone number, mailing address, email address, etc.), a name of the recipient (and/or other user identifier, phone number, mailing address, email address, etc.), a notation of a reason for the transfer, sanction screening data, etc.). It should be appreciated that in various embodiments, the user 110 is authenticated, by the application 114, in connection with either accessing the application 114 or initiating the fund transfer. In such embodiments, single factor or multi-factor authentication may be based on a password, a PIN, a biometric, etc.

In response to the transfer instruction (from the user 110), the communication device 112, as configured by the application 114, transmits, at 302, a push transfer instruction to the network 106. The push transfer instruction may be transmitted to the network 106 in any suitable manner, including, for example, as a network message (e.g., via a standard implemented between the institution 102 and the network 106, etc.) or as an API call to an API exposed by the network 106, etc. Regardless, upon receipt of the push transfer instruction, the network 106 identifies the institution 102 associated with the transfer (e.g., based on an account number provided in the instruction or an identifier included in the instruction, etc.) and compiles, at 304, a pre-authorization message for the transfer. The network 106 further maps the account number from the request to a related card number and includes both the account number and the related card number in the pre-authorization message. In addition, each of the networks 106 and 108 included in the system 100, for example, will include a unique network ID. As such, one network ID is associated with the network 106, while another network ID is associated with the network 108. The network ID for the network 106, in this example, is included in the pre-authorization request to identify the network(s) involved in the transaction to the institution 102 (e.g., an issuer of the source account, etc.). More specifically, the network ID is indicative of the non-card payment network being involved in the transaction. Further, in this example (as indicated above with regard to the system 100), the pre-authorization message is consistent with the ISO 8583 standard, and includes, specifically, a 0200 message, which includes in the appropriate data elements, without limitation, a transfer amount, a pseudo terminal, merchant, and acquirer ID, as well as a real country ID, a currency ID, other data elements required by common card-based payment schemes, a risk assessment, and/or level of authentication provided by the user 110, etc.

Once compiled, the network 106 transmits, at 306, the pre-authorization message to the institution 102, via Base24 computing device 118. The institution 102 responds, at 308, via Base24 computing device 120, to the pre-authorization message with a reply message (e.g., an approve message in this example, etc.), which is based on the funds available in the account issued to the user 110 and/or the general standing of the user's account, etc. At this point, in a single message model, the institution debits the funds from the source account for the transaction. While in a dual message model, the institution 102 places a hold on funds in the source account sufficient to satisfy the transaction.

In connection with the above, the network 106 further identifies the network 108 as being associated with the destination account, based on the account number, the phone number, and/or the email address included in the transfer instruction and/or a specific designation of the network 108 (e.g., a network ID), etc.

In turn, the network 106, and in particular, the messaging gateway 122 translates, at 310, the pre-authorization message into a transfer instruction in the standard of the network 108 for the transfer (e.g., the ISO 20022 standard implemented by the network 108 and the institution 104 in the above example, etc.). The transfer instruction then includes the transaction amount, destination account identifier, source account identifier, and email address and/or phone number for the user 110 and/or the recipient, etc. It should be appreciated that the data may be included from the push transfer instruction (e.g., the API call, etc.), or it may be augmented from data held by the network 106 (or the gateway 122) (or, potentially, a third party associated with and/or in communication with the institution 102) to be added to the transfer instruction (e.g., a name, card number, email address, mailing address, etc.). Additionally, in one or more embodiments, data received from the institution 102, in response to the pre-authorization message (as included in the reply message) may be included in the transfer instruction to the network 108. Further, the transfer instruction may include a risk assessment and/or level of authentication provided by the user 110, etc.

Once translated, the transfer message is transmitted, by the network 106, at 312, to the network 108. Table 1 illustrates an example translation of a transfer message from a message format consistent with the ISO 8583 standard to a message format consistent with the ISO 20022 standard.

TABLE 1

| ISO 8583 Message Format | ISO 20022 Message Format | Mapping Logic |
| --- | --- | --- |
| Card number | Account number | |
| Acquirer ID | Financial Institution ID | |
| Card | Debtor Account (DbtrAcct) | Use internal mapping of card to account numbers (e.g. DDA, Money Market, Savings, etc.) to map back from the account number (member ID) to the related card number. Also pass the Debtor account in an additional 8583 data element. |
| Merchant Name | Creditor Name (Cdtr−>Nm) | |
| Requested Amount | Total Interbank Settlement Amount (TtlIntrBkSttlmAmt | |
| Merchant currency | Currency (TtlIntrBkSttlmAmt−>Ccy) | |

In response, the transfer instruction is forwarded, by the network 108, to the institution 104, at 314 (e.g., via the ISO 20022 standard, etc.). And, upon receipt, the institution 104 records, at 316, the transfer, whereby funds are available in the destination account (at the institution 104) for the entity associated with the account. In addition, the institution 104 transmits, at 318, a transfer acknowledgement message back to the network 108 (e.g., via the ISO 20022 standard, etc.).

Next in the method 300, the network 108 forwards, at 320, the transfer acknowledgment message to the network 106 (e.g., via the ISO 20022 standard, etc.). In connection therewith, funds are transferred or settled (e.g., between the institution 102 and the institution 104, etc.) based on a variety of mechanisms, as required by the involved networks 106 and 108. For example, the Zelle™ network may require funds to transfer via ACH, or via The Clearing House's Real Time Payments interface, etc. Similarly, another mechanism may rely on the Mastercard™ or Visa™ institution-to-institution fed wire transfers.

Thereafter, the network 106 (e.g., by way of the gateway 122, etc.) compiles and transmits, at 322, an authorization completion message, via Base24 computing device 118, to the institution 102 (and the Base24 computing device 120 associated therewith), where the authorization completion message is in the ISO 8583 standard, thereby indicating to the institution 102 that the transfer is complete and/or confirmed. In addition, the network 106 transmits, at 324, an auxiliary message for the transfer, which is not specific to the ISO 8583 standard (and thereby avoids the Base24 computing devices 118 and 120), and which includes additional data related to the transaction (e.g., from the transfer instruction message transmitted by the network 106 to the network 108 and/or from the acknowledgement message received by the network 106 from the network 108, etc.).

Figure 4:
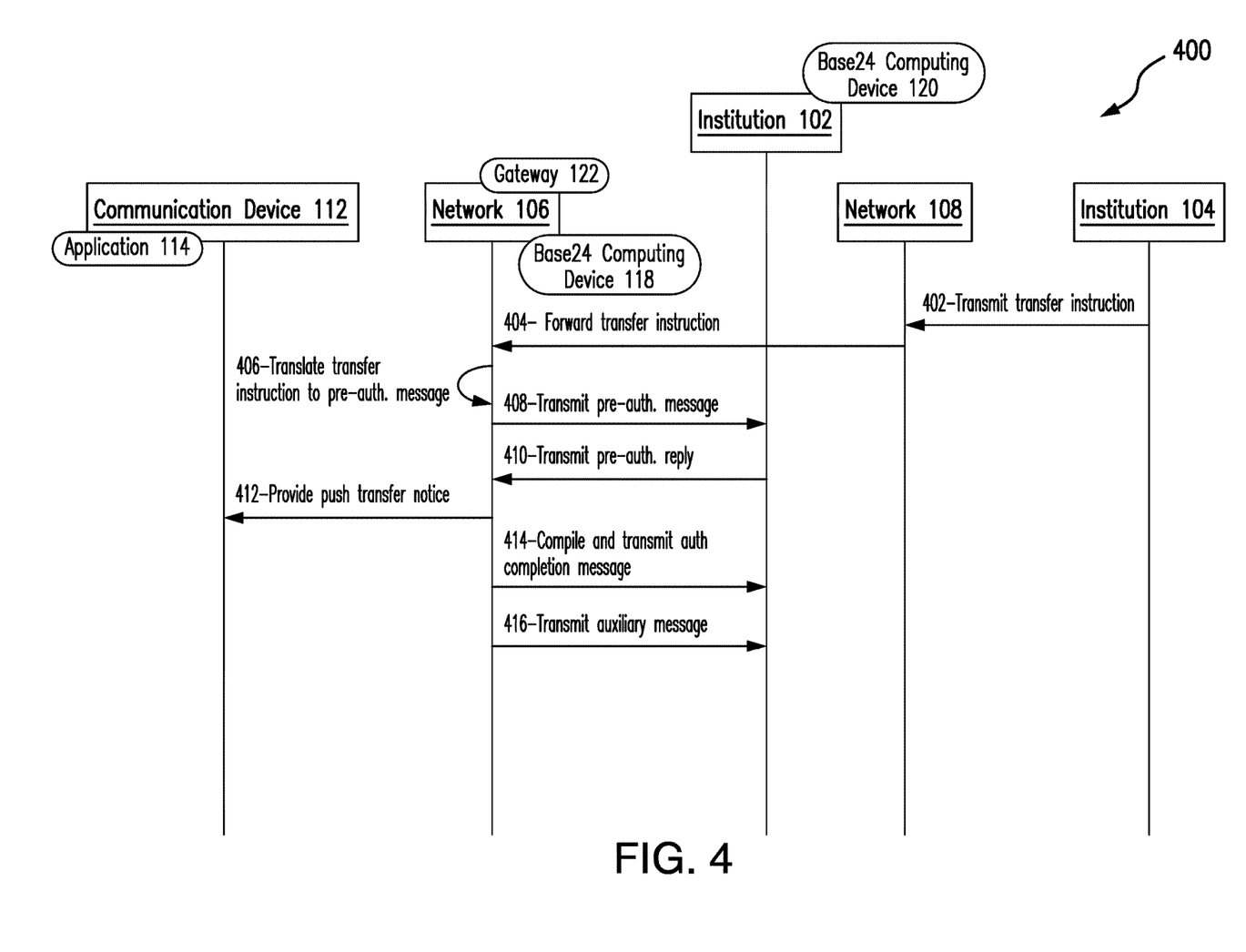
FIG. 4 is another exemplary method that may be implemented in the system of FIG. 1 for use in facilitating messaging between networks in connection with a push transaction by a user.

FIG. 4 illustrates another exemplary method 400 for use in facilitating a push fund transfer from an account associated with a user. The exemplary method 400 is described with reference, again, to FIG. 1, including the institutions 102 and 104, the networks 106 and 108, and the communication device 112, and also with reference to the computing device 200 of FIG. 2. However, it should be understood that the method 400 is not limited to the system 100 or the computing device 200. And, likewise, the systems and the computing devices herein should not be understood to be limited to the exemplary method 400.

At the outset in the method 400, a user associated with an account issued by the institution 104 decides to push funds to the user 110 and, specifically, the user's account issued by the institution 102. In connection therewith, as part of initiating the push transaction in this example for the transfer, the user initiates a push transfer instruction with the network 108 and/or the institution 104. Consistent with the instruction, the institution 104 transmits, at 402, a transfer instruction for the push transaction, which is a real time transaction, to the network 108 (if the transaction is not already initiated with the network 108) (e.g., in the format associated with the network 108 and the institution 104 (e.g., a format consistent with the ISO 20022 standard in the above example, or Zelle or otherwise, etc.). The transfer instruction includes an amount to be transferred, an identification of the source account at the institution 104, and the destination account of the user 110 at the institution 102, and any other details which may be needed or helpful in the transfer (e.g., a name of the user initiating the transaction (and/or a phone number, a mailing address, an email address, etc.), a name of the user 110 (and/or a phone number, a mailing address, an email address, etc.), a notation of a reason for the transfer, sanction screening data, etc.).

Upon receipt of the transfer instruction, the network 108 identifies the transaction as associated with an account for the network 106 and forwards, at 404, the transfer instruction to the network 106 (e.g., in a format consistent with the ISO 20022 standard, etc.) and, in particular, to the message gateway 122. The transfer instruction is identified to the network 106 based on an account number (or part thereof), a routing number, a phone number of the user 110, an email address of the user 110, or potentially a listing of the same identified to particular networks, etc.

In response to the transfer instruction, the message gateway 122 translates the message into a pre-authorization message, in a format implemented by the institution 102 (e.g., in a format consistent with the ISO 8583 standard, etc.), at 406. And, then, the Base24 computing device 118 transmits the pre-authorization message, at 408, to the institution 102, via Base24 computing device 120. The institution 102 in turn transmits a pre-authorization reply to the network 106, at 410. In turn, upon receipt of the pre-authorization reply, the network 106 provides, at 412, a push transfer notice to the user 110 at the communication device 112, for example, via the application 114 as notification of the transfer.

Upon receipt of the pre-authorization reply message, and prior to or after the notice to the user 110, the network 106 compiles and transmits, at 414, an authorization completion message, via Base24 computing device 118, in the format implemented by the institution 102 (e.g., in the format consistent with the ISO 8583 standard, etc.), thereby indicating to the institution 102 that the transfer is complete and/or confirmed. In addition, the network 106 transmits, at 416, an auxiliary message for the transfer to the institution 102, which is not specific to the message format implemented by the institution 102 (and thereby avoids the Base24 computing devices 118 and 120), which includes additional data related to the transaction (e.g., from the transfer instruction message transmitted by the network 108 to the network 106, etc.) (as explained above).

In connection therewith, funds are transferred or settled based on a variety of mechanisms, as required by the involved networks. For example, the Zelle™ network may require funds to be transferred via ACH, or via The Clearing House's Real Time Payments interface, etc. Similarly, another mechanism may rely on the Mastercard™ or Visa™ institution-to-institution fed wire transfers. In various embodiments, the funds in the transfer pursuant to method 300 are then settled at a later time, with the sending financial institution setting them aside until settlement (e.g., the issuer of the user's account places a hold on the funds and/or removes the funds from the user's account, etc.) and with the receiving financial institution extending the funds to the account holder before actually receiving the funds from the transfer through settlement (e.g., the acquirer permits usage of the funds even when not settled, etc.). More generally, the above message is a commitment to transfer the funds and/or permit settlement for the transfer, on which the other institution may rely. The transfer may be characterized by elimination of a chargeback mechanism for the transfer (i.e., no chargeback rights), whereby the funds are committed without a reversal option for the sending user or the associated institution.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a network, an instruction associated with a first user and specific to a first user account, the instruction directed to a second user account associated with a second user; (b) compiling, at the network, a pre-authorization message indicative of the instruction, the pre-authorization message consistent with a first message standard and including an identifier of the first user account; (c) transmitting, by the network, the pre-authorization message to a first institution associated with the first user account; (d) translating, by the network, the pre-authorization message and/or the instruction into a transfer instruction, the transfer instruction consistent with a second message standard different than the first message standard, the transfer instruction including the identifier of the first user account and an identifier of the second user account; and (e) transmitting, by the network, the second message to a different network, thereby permitting the delivery of the transfer instruction consistent with the second standard to a second institution associated with the second user account.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and "at least one of" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating network messages, the method comprising:
   receiving, at a network, via an application programming interface (API) of the network, a push funds transfer instruction associated with a first user and specific to a first user account, the push funds transfer instruction directing a funds transfer from the first user account to a second user account associated with a second user, the push funds transfer instruction including an identifier of the second user account;
   compiling, at the network, a pre-authorization message indicative of the push funds transfer instruction, the pre-authorization message consistent with a first financial interchange message standard and including an identifier of the first user account;
   transmitting, by the network, the pre-authorization message to a first institution associated with the first user account;
   identifying, by the network, a different network associated with the second user account based on the identifier of the second user account included in the push funds transfer instruction, the different network associated with a second financial interchange message standard, whereby the different network is incompatible with the first message standard;
   in response to identifying the different network, translating, by the network, based on a mapping logic, data elements of the push funds transfer instruction and additional data into data elements of a transfer instruction consistent with the second message standard, the transfer instruction including the identifier of the first user account and the identifier of the second user account;
   transmitting, by the network, the transfer instruction to the different network, thereby permitting delivery of the transfer instruction consistent with the second message standard to a second institution associated with the second user accounts;
   receiving, by the network, a transfer acknowledgment message in response to the transfer instruction; and
   based on the transfer acknowledgment message, compiling and transmitting, by the network, a subsequent message for the push funds transfer instruction to the first institution, the subsequent message consistent with the first message standard, the subsequent message including an authorization completion message for said funds transfer.

2. The computer-implemented method of claim 1, wherein the first message standard includes an ISO 8583 standard at the time of filing.

3. The computer-implemented method of claim 1, wherein transmitting the pre-authorization message to the first institution includes transmitting the pre-authorization message, via a Base24 computing device, to the first institution.

4. The computer-implemented method of claim 3, wherein transmitting the subsequent message includes transmitting the subsequent message to the first institution via the Base24 computing device.

5. The computer-implemented method of claim 4, further comprising transmitting an auxiliary message, for the push funds transfer instruction, to the first institution, apart from the Base24 computing device; and
   wherein the auxiliary message includes data specific to the instruction, included in the transfer instruction, but omitted from the pre-authorization message and the subsequent message.

6. The computer-implemented method of claim 1, wherein the first message standard includes an ISO 8583 standard at the time of filing;
   wherein the second message standard includes an ISO 20022 standard at the time of filing.

7. The computer-implemented method of claim 1, wherein the transfer instruction includes an amount and at least one of a phone number and/or an email address associated with the second user associated with the second user account.

8. A system for use in facilitating network messages, the system comprising:
   a network including a computing device and a gateway coupled to the computing device, the network coupled to a first institution and a real time payment network;
   wherein the computing device of the network is configured to:
      receive, via an application programming interface (API) of the network, a push funds transfer instruction associated with a first user and specific to a first user account, the push funds transfer instruction directing a funds transfer from the first user account to a second user account associated with a second user, the push funds transfer instruction including an identifier of the second user account;
      compile a pre-authorization message indicative of the push instruction, the pre-authorization message consistent with a first financial interchange message standard and including an identifier of the first account;
      transmit the pre-authorization message to the first institution;
      identify the real time payment network based on the identifier of the second account, the real time payment network associated with a second financial interchange message standard, whereby the real time payment network is incompatible with the first message standard; and
   wherein the gateway of the network is configured to:
      translate, based on a mapping logic, data elements of the pre-authorization message and additional data into data elements of a transfer instruction specific to the second message standard, the transfer instruction including the identifier of the first account and the identifier of the second account;
      transmit the transfer instruction to the real time payment network, thereby permitting delivery of the transfer instruction consistent with the second message standard to a second institution identified in the transfer instruction and associated with the real time payment network;
      receive a transfer acknowledgment message in response to the transfer instruction; and
      based on the transfer acknowledgment message, compile and transmit a subsequent message for the push funds transfer instruction to the first institution, the subsequent message consistent with the first message standard, the subsequent message including an authorization completion message for said funds transfer.

9. The system of claim 8, wherein the computing device includes a Base24 computing device; and
wherein the first message standard includes an ISO 8583 standard at the time of filing.

10. The system of claim 8, wherein the network is configured to transmit an auxiliary message, apart from the computing device, to the first institution in response to the acknowledgement of the transfer instruction from the real time payment network and apart from the authorization completion message.

11. A non-transitory computer-readable storage medium including executable instructions for facilitating network messages, which, when executed by at least one processor, cause the at least one processor to:
   receive, via an application programming interface (API) of the network, a push funds transfer instruction to transfer funds associated with a first user and specific to a first user account, the push funds transfer instruction directing a funds transfer from the first user account to a second user account associated with a second user, the push funds transfer instruction including an identifier of the second user account;
   compile a pre-authorization message indicative of the push funds transfer instruction, the pre-authorization message consistent with a first financial interchange message standard and including an identifier of the first user account;
   transmit the pre-authorization message to a first institution;
   identify a real time payment network associated with the second user account based on the identifier of the second user account, the real time payment network associated with a second financial interchange message standard, whereby the real time payment network is incompatible with the first message standard;
   in response to identifying the real time payment network, translate, based on a mapping logic, data elements of the pre-authorization message and/or the push funds transfer instruction and additional data into data elements of a transfer instruction, the transfer instruction consistent with the second message standard, the transfer instruction including the identifier of the first user account and the identifier of the second user account;
   transmit the transfer instruction to the real time payment network, thereby permitting delivery of the transfer instruction consistent with the second message standard to a second institution identified in the transfer instruction and associated with the real time payment network;
   receive a transfer acknowledgment message in response to the transfer instruction; and
   based on the transfer acknowledgment message, compile and transmit a subsequent message for the push funds transfer instruction to the first institution, the subsequent message consistent with the first message standard, the subsequent message including an authorization completion message for said funds transfer.

12. The non-transitory computer-readable storage medium of claim 11, wherein the first message standard includes an ISO 8583 standard at the time of filing; and
wherein the second message standard includes an ISO 20022 standard at the time of filing.

13. The non-transitory computer-readable storage medium of claim 11, wherein the executable instructions, when executed by the at least one processor, further cause the at least one processor to, in response to an acknowledgement of the transfer instruction from the real time payment network:
   transmit an auxiliary message, for said transfer instruction, to the first institution apart from the authorization completion message, the auxiliary message including data specific to the push funds transfer instruction and included in the transfer instruction, but omitted from the pre-authorization message and the authorization completion message.

* * * * *